Figure 1:
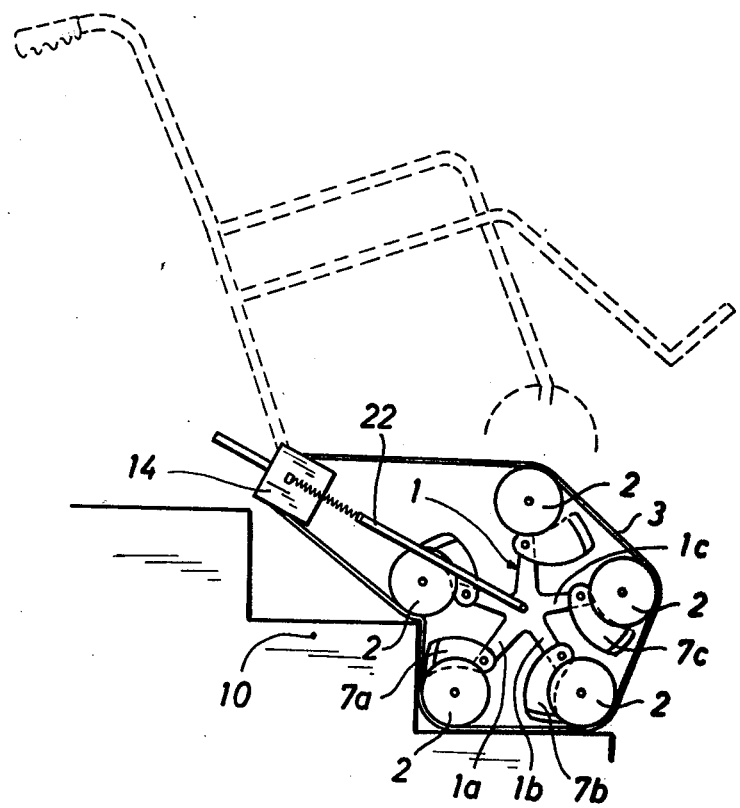

United States Patent [19]

Rasmussen

[11] 4,154,315
[45] May 15, 1979

[54] CHASSIS FOR STAIR-CLIMBING VEHICLES

[75] Inventor: Gunnar O. V. Rasmussen, Odense, Denmark

[73] Assignee: Karl-Heinz Werner Toosbuy, Bredebro, Denmark

[21] Appl. No.: 760,483

[22] Filed: Jan. 19, 1977

[30] Foreign Application Priority Data

Jan. 21, 1976 [DK] Denmark ............................. 240/76

[51] Int. Cl.² ............................................ B62D 55/00
[52] U.S. Cl. ................................ 180/8 A; 180/9.2 R; 280/DIG. 10
[58] Field of Search ............... 180/8 A, 9.2; 280/5.26, 280/5.22, DIG. 10

[56] References Cited

U.S. PATENT DOCUMENTS

| 2,742,973 | 4/1956 | Johannessen | 180/8 A |
| 3,730,287 | 5/1973 | Fletcher et al. | 180/8 A |

Primary Examiner—John A. Pekar
Attorney, Agent, or Firm—Pollock, Vande Sande & Priddy

[57] ABSTRACT

A chassis for stair-climbing wheel chairs with step wheels mounted on a star-shaped rotating supporting means, the step wheels being surrounded by an elastic endless belt, the latter being in contact with portions of the step wheel peripheries. Locking means are mounted on the rotatable supporting portion and are lockable to the inside of the belt means, when the latter is pressed towards the locking means by a stair during the stair climbing operation. When the chassis climbs, the belt being driven, the supporting means will rotate. The locking means releases when the stair has been passed.

10 Claims, 7 Drawing Figures

CHASSIS FOR STAIR-CLIMBING VEHICLES

The present invention relates to an improvement of the construction disclosed in U.S. Pat. No. 4,061,199, relating to a chassis for vehicles with road wheels and step wheels, wherein the road wheel is capable of travelling over obstructions, and wherein the step wheels are connected by means of an endless stretchable belt means, and the chassis is characterized in that the belt means is coupled to at least one drive and in a driving manner engages portions of the peripheries of the step wheels.

The present invention relates to an improvement of this chassis, particularly for stair-climbing wheel chairs, and permits a very reliable drive on stairs, which have become slippery, e.g., due to the presence of ice or soapy water.

A chassis according to the invention is characterized in that the endless belt means is substantially stretch-resistant, and that the drive is a bracing and driving unit, and that locking means are mounted on the rotatable supporting portion of the step wheels, preferably adjacent said step wheels, each of said locking means being lockable to the inside of the belt means when the latter is pressed towards the locking means by a stair during the stair climbing operation, the locking means, however, releasing the belt means when the stair has been passed. This provides a stair-climbing wheel chair independent of the friction between stair and belt means, said friction, according to the above-identified prior patent, being necessary for a satisfactory operation of the chassis. When a wheel chair drives against a stairway, the first stair presses a portion of the belt means inwards towards one of the surfaces of the adjacent locking means. In this manner a local locking of the belt means to the supporting portion of the supporting wheels is provided, and since the belt means is continuously driven by the bracing and driving unit the supporting portion of the step wheels starts to rotate about an axis adjacent the locking spot. Thus the chassis climbs the stair. When a step wheel has passed the stair, the belt means opposite the step wheel is no longer pressed inwards and consequently not pressed into contact with the locking means. When the chassis drives on a large horizontal surface, the belt means surrounding the step wheels is spaced from the locking means, thus avoiding any locking between the belt means and the supporting portion. After the stair-climbing operation the chassis is swung up under the wheel chair.

According to the invention, the belt means may be toothed on its inside and be constituted by one or more endless rubber beltings with embedded cords of e.g., steel wires or nylon strands. As a result the belt means locks the supporting portion in a particularly reliable manner.

Furthermore, according to the invention, the bracing and driving unit may comprise a section with driving means fixedly mounted on the frame of the wheel chair, said driving means preferably being formed as a gear-wheel driven by a geared motor, a pressure wheel, if any, for the endless beltings, and supporting means preferably in the form of rollers for the fork of the supporting portion, said fork forming the movable section of the bracing and driving unit, the fork and the fixed section being connected by pressure springs in such manner that the belting or beltings are always stretched. When the chassis drives against a stair and the stair presses the belting inwards, the fork simultaneously slides somewhat into the above fixed section.

Finally, according to the invention, the supporting portion may comprise arms radiating outwards in a star pattern, and the step wheels may be grouped in pairs at the end of each arm, a wheel may be provided on both sides of such arm, and the locking means may be constituted by ratchet shaped portions loaded by pressure springs, one for each wheel, and each ratchet shaped portion may comprise a coating e.g., of rubber, at its outer end cooperating with the inside of the belting, said coating providing friction. Thus the belting and the supporting portion may be locked in the same way as a self-locking brake, this locking automatically being released when certain parts of the belting have passed the stair. The chassis is very well suited for climbing both up and down stairs.

Figure 2:
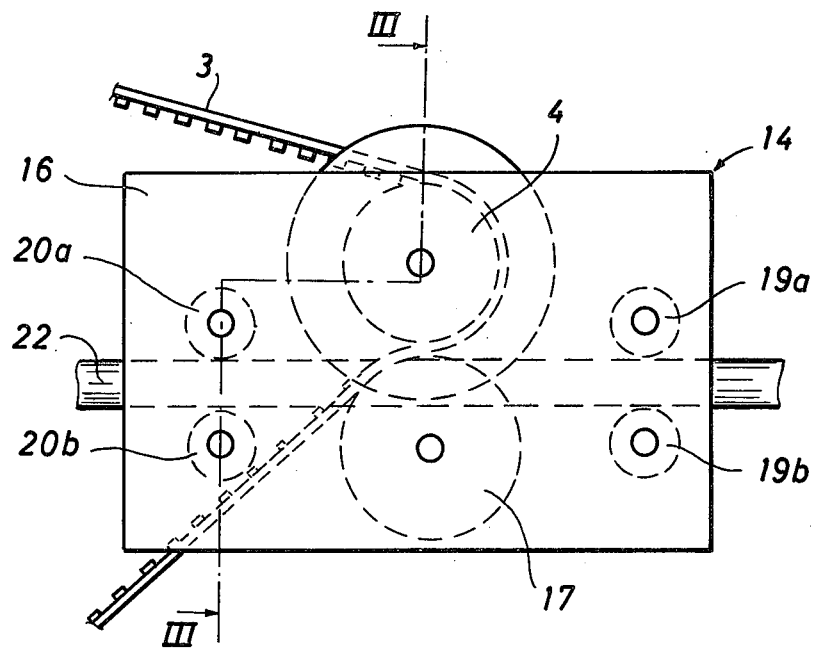
Figure 3:
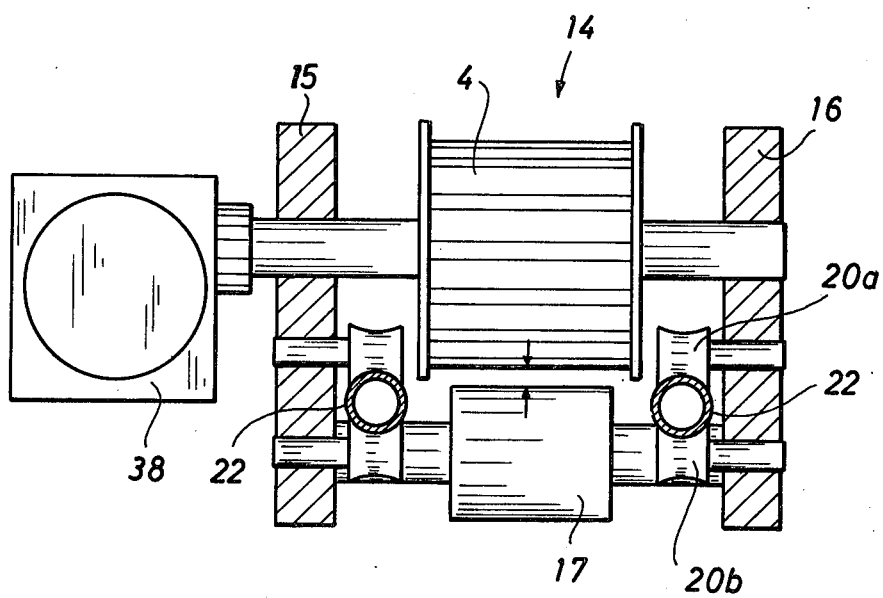
Figure 4:
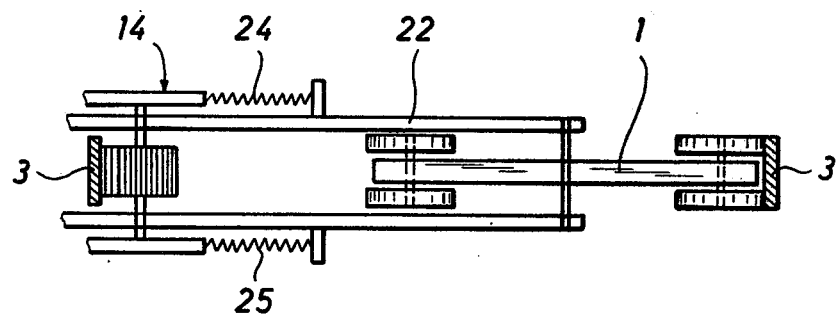
Figure 5:
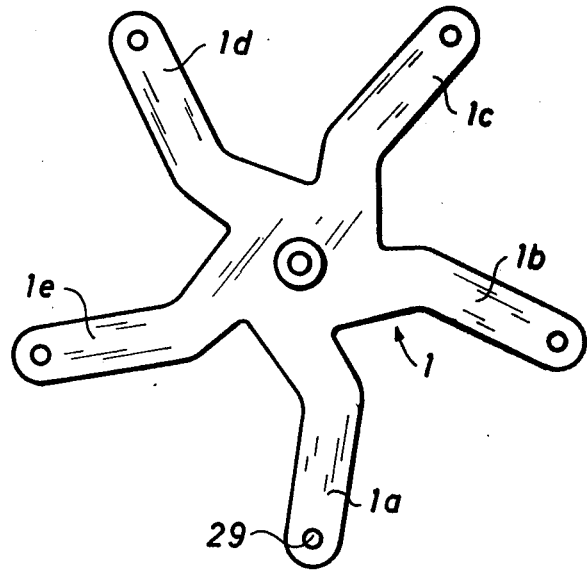
Figure 6:
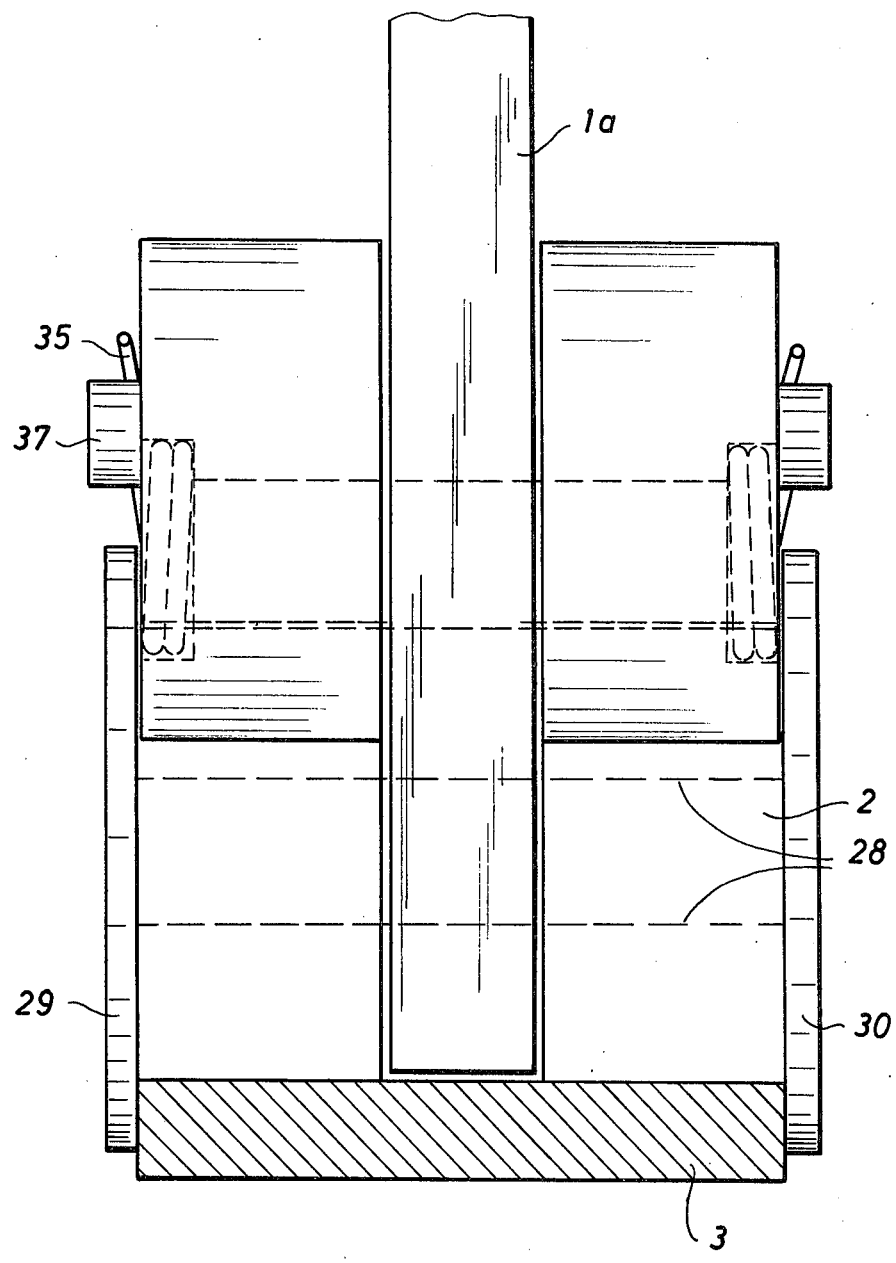
Figure 7:
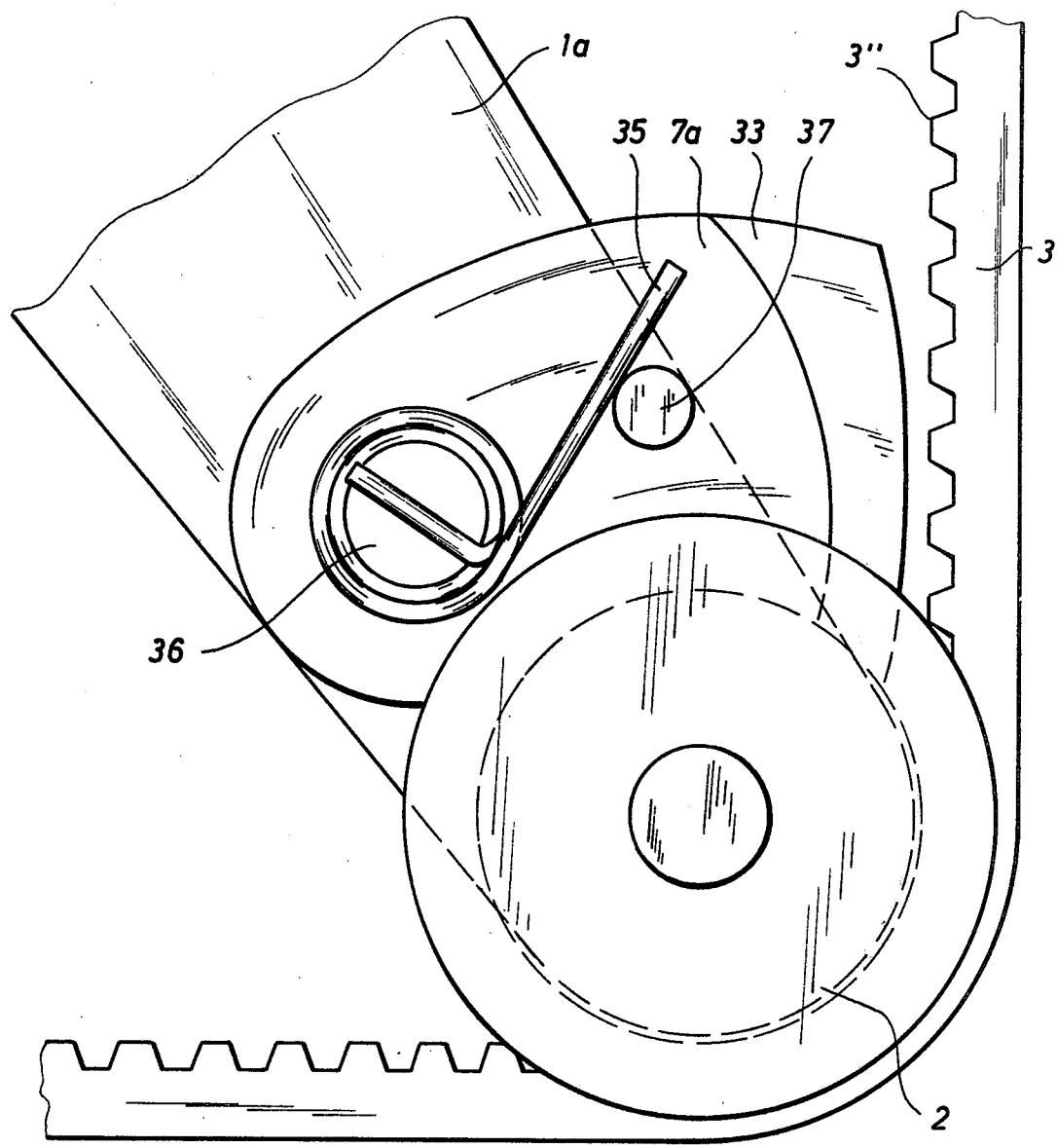

The invention will be described below with reference to the accompanying drawings, in which FIG. 1 is a side view of an embodiment of the chassis according to the invention, the chassis climbing a stairway, FIG. 2 is a side view of the stationary portion of the bracing and driving unit of the chassis, FIG. 3 is a sectional view taken along the line III—III of FIG. 2, FIG. 4 is a plan view of the chassis of FIG. 1, FIG. 5 illustrates the supporting portion of the chassis for supporting the step wheels (not shown), FIG. 6 illustrates the outer portion of an arm of the supporting portion, said arm being provided with step wheels and locking means, and FIG. 7 is a side view of the portion of FIG. 6.

The chassis illustrated in FIG. 1 comprises a star-shaped supporting portion 1, a plurality of step wheels 2 and an endless stretch-resistant belt means 3 engaging portions of the peripheries of said step wheels 2. The belt means furthermore extends around a drive wheel 4. Locking means 7a, 7b, 7c, 7d and 7e are mounted on the arms 1a, 1b, 1c, 1d and 1e of the supporting portion. These locking means are lockable to the inside of the belt means 3 when the latter is pressed towards the middle of the supporting portion 1 by the stair 10.

The belt means 3 is driven by a bracing and driving unit 14 comprising the above drive-wheel 4, preferably a gear-wheel.

The bracing and driving unit 14 illustrated in detail in FIG. 2 comprises two mutually facing side plates 15 and 16, the above gear-wheel 4, a pressure wheel 17, and four pairs of supporting rollers 19a, 19b, 20a and 20b. These rollers cooperate with a fork-shaped frame 22 supporting the supporting portion 1 of the chassis. The unit 14 and the frame 22 are connected by two pressure springs 24 and 25 (FIG. 4), so that the belt means 3 is always in close contact with the step wheels 2 and the gear-wheel 4.

The belt means 3 is preferably constituted by one or more endless beltings of rubber or similar material providing friction, wherein cords of low elasticity are embedded. These cords may for instance be steel wires or nylon strands.

FIG. 5 illustrates on a larger scale the star-shaped supporting portion 1 of the chassis with the arms 1a, 1b, 1c, 1d and 1e radiating outwards. FIG. 6 is a side view of the outer portion of an arm 1a. The step wheels 2 are grouped in pairs, one wheel on each side of the arm 1a. They are arranged on a common projection 28 extending through a hole in the arm 1a. End portions 29 and 30 are arranged at the free ends of each step wheel 2, said portions controlling the sideways movement of the belting 3, as illustrated in the cross-section at the bottom of the Figure.

As particularly illustrated in FIG. 7, a locking means in the form of a pawl-like portion 7a is mounted opposite each step wheel 2, said portion at its outer end being provided with a coating 33 providing friction. This coating may, as illustrated, cooperate with the inside 3" of the beltings 3. The inside 3" is preferably toothed, as illustrated. The pawl 7a is at one side loaded by a pressure spring 35 secured at one end to the projection 36 about which the pawl 7a may rotate, and being free at the other end. The latter presses against a projection 37 protruding from the pawl 7a.

When the chassis shown in FIG. 1 approaches the stair 10, the belting portion 3' is pressed towards the middle of the chassis. Simultaneously, the fork 22 slides somewhat into the stationary section 14 and consequently the pawls 7 at the adjacent step wheels 2 touch the inside 3" of the belting 3, thus locking the belting 3 and the arm of the supporting portion relative to each other. This locking, however, also depends on the weight of the user of the wheel chair. Since the driving gear-wheel 4 rotates continuously, the supporting portion 1 starts to rotate about an axis adjacent the stair 10. This rotation implies that the supporting portion 1 and consequently the chassis roll on or climb the stair 10 and the successive stairs in a very reliable manner. The climbing movement is independent of friction between the belting 3 and the stair 10 so the chassis can climb up and down stairs even though the stairs are slippery owing to for instance ice or soapy water.

It is preferred to drive the gear-wheel 4 illustrated in FIG. 3 by a geared motor 38 arranged outside the side plate 15. The height of the nip zone between the gear-wheel 4 and the pressure wheel 17 is somewhat smaller than the thickness of the belting, thus providing a suitable pressure on the belting. This pressure prevents the belting from slipping on the surface of the gear-wheel 4.

The coating 33 of the pawl 7a may be provided with profiling on the side facing the inside 3" of the belting.

I claim:

1. A chassis for a stair-climbing vehicle having a frame and comprising step wheels mounted on a rotatable support member and having their peripheries connected by an endless belt means driven by at least one drive means spaced from said support member, comprising:
   (a) locking means pivotally mounted on said rotatable support member adjacent each said step wheel for relative movement with respect to said belt means;
   (b) each said locking means being lockable to the inner side of said belt means when the latter is pressed against a surface of said locking means by a stair step during stair climbing of said vehicle, said locking means releasing said belt means when said stair step has been passed;
   (c) said belt means being stretch-resistant;
   (d) whereby said belt means is locked in relation to said support means during climbing of a said stair step.

2. A chassis according to claim 1, wherein said drive means comprises a bracing and driving unit, comprising:
   (a) a section mounted on the frame of said vehicle:
   (b) a gear wheel;
   (c) a geared motor for driving said gear wheel;
   (d) a pressure wheel for exerting pressure on said belt means;
   (e) fork means for supporting said support member; and
   (f) pressure spring means connecting said fixed section and said fork means for maintaining said belt means in contact with said step wheels.

3. A chassis according to claim 1, wherein said rotatable support member comprises arms radiating from a center hub in a star pattern.

4. A chassis according to claim 3, wherein said step wheels are grouped in pairs at the ends of each said arm, one step wheel being provided on both sides of said arm.

5. A chassis according to claim 1, wherein said belt means is toothed on its inner surface facing said step wheels.

6. A chassis according to claim 1, wherein said belt means is made of frictional material.

7. A chassis according to claim 6, wherein said belt means has steel wire embedded therein.

8. A chassis according to claim 6, wherein said belt means has nylon strands embedded therein.

9. A chassis according to claim 5, wherein said locking means comprises a pawl for each said step wheel, each said pawl being loaded by a pressure spring toward said belt means.

10. A chassis according to claim 9, wherein said pawl has a frictional coating at its outer end cooperating with the inner surface of said belt means.

* * * * *